Nov. 20, 1962  H. KÄUFER ET AL  3,064,795
ELASTIC CHAIN FOR FILM PROCESSING APPARATUS AND THE LIKE
Filed June 20, 1960  3 Sheets-Sheet 3

INVENTORS:
HELMUT KÄUFER
ADOLF DEEG
RICHARD SCHWAB
BY
Michael S. Striker
their ATTORNEY United States Patent Office 3,064,795
Patented Nov. 20, 1962

3,064,795
ELASTIC CHAIN FOR FILM PROCESSING
APPARATUS AND THE LIKE
Helmut Käufer, Grunwald, near Munich, Adolf Deeg, Munich, and Richard Schwab, Munich-Grunwald, Germany, assignors to Agfa Aktiengesellschaft, Leverkusen-Bayerwerk, Germany
Filed June 29, 1960, Ser. No. 37,436
Claims priority, application Germany June 26, 1959
10 Claims. (Cl. 198—175)

The present invention relates to sprocket chains in general, and more particularly to an elastic sprocket chain which is especially suited for use in conveying arrangements of film processing apparatus and the like.

Recent types of film processing apparatus usually comprise a conveying arrangement which includes one or more endless flexible members mounted for movement in a meandering path through the various tanks forming part of such apparatus to entrain one or more emulsion carriers so that the exposed emulsion applied to the carriers is subjected to a series of successive treatments. For example, the processing apparatus may comprise a developing tank, a shortstop tank, a fixer tank and a washing tank, and the endless flexible element or elements entrain the strip-shaped emulsion carriers through such tanks in a predetermined sequence toward the discharge end of the apparatus.

It was already proposed to utilize endless flexible elements in the form of belts or acid-resistant steel chains to which the emulsion carriers are connected for movement through the film processing apparatus. However, a belt conveyor cannot be driven with sufficient accuracy and is likely to tear, particularly at points of connection with the supporting means for the emulsion carriers. Furthermore, it is rather difficult to properly connect the supporting means to and to separate the supporting means from a belt-shaped conveyor. On the other hand, the conveyors utilizing acid-resistant steel chains are rather expensive, and it is always difficult to exchange a defective link in a steel chain. Moreover, a steel chain normally will not yield or will be permanently deformed if a foreign body enters between its links and the sprockets over which the chain travels.

An important object of the present invention is to provide an improved sprocket chain for use in conveying arrangements of film processing apparatus which fully overcomes the drawbacks of prior constructions and whose links may be readily separated and conveniently replaced with very little loss in time.

Another object of the invention is to provide an elastic sprocket chain which is longitudinally extendable so that it may yield without any damage thereto when a foreign body enters between its links and the sprockets.

A further object of the invention is to provide a chain of the above outlined characteristics which may be produced at a much lower cost than a chain consisting of acid-resistant steel and which may be conveniently lengthened or shortened without requiring a dismantling of the film conveying arrangement.

A concomitant object of the instant invention is to provide a chain of the above described type which consists of very simple component parts, which may be readily installed in film processing apparatus of presently known design, and which allows for substantial reduction in the overall weight of such apparatus.

With the above objects in view, the invention resides in the provision of an elastic sprocket chain which consists of substantially U-shaped one-piece links made preferably by an injection molding process of at least slightly elastic synthetic plastic material. Since the plastic material is much lighter than steel, the use of such chains brings about a considerable reduction in the overall weight of the film processing apparatus and, owing to its elasticity, the chain will not tear when a foreign body enters between its links and the sprockets over which the chain travels. Furthermore, the elastic nature of the chain enables it to automatically return to its original length as soon as the foreign body is removed or as soon as the stresses causing its expansion are terminated. The cost of a plastic chain is but a fraction of the cost of a steel chain.

In one of its preferred forms, the chain comprises links consisting of a pintle and of two side plates, the side plates of one link being rotatably and readily separably connected with the pintle of another link. In order to improve the elasticity of the chain, the side plates are preferably formed with offset median portions which permit lengthening of the side plates in response to stretching forces but return to their normal shape as soon as such stresses are terminated. The pintles of each substantially U-shaped link may be formed with terminal portions which actually constitute projections of the side plates and which extend outwardly beyond the respectively side plates and may be rotatably received in openings formed in the side plates of an adjacent link so that the links may be separated merely by deflecting the side plates away and out of contact with the adjacent terminal portions.

The material for the chain links may be selected from a wide variety of plastics, preferably from the group which may be shaped by an injection molding process. Of course, the selection of a specific material also depends on the intended use of the chain, particularly as regards the required resistance to the action of acids utilized in a film processing apparatus. For example, the chain links may consist of polycarbonate (e.g. carbon-polyester of 4,4′ dioxidiphenyl-2,2-propane, poly-bisphenol or poly di-aleyl-diylykol-carbonate), polypropylene or polyamide. Polyamide was found to be particularly satisfactory because of its self-lubricating characteristics, i.e. a polyamide chain requires little or no maintenance.

According to another feature of our invention, the chain links may be integrally formed with entraining means which releasably hold a film supporting bar or the like during advance of emulsion carriers through the processing apparatus. The entraining means may assume the form of U-shaped elements whose recesses are dimensioned in such a way that the film supporting bar is received therein with sufficient friction to prevent unintentional separation therefrom, i.e. the dimensions of recesses in unstressed condition of the entraining means are smaller than the dimensions of parts received therein.

The novel features which are considered as characteristic for the invention are set forth in particular in the appended claims. The invention itself, however, both as to its construction and its method of operation, together with additional objects and advantages thereof, will be best understood from the following detailed description of a specific embodiment when read in connection with the accompanying drawings, in which:

Figure 1:
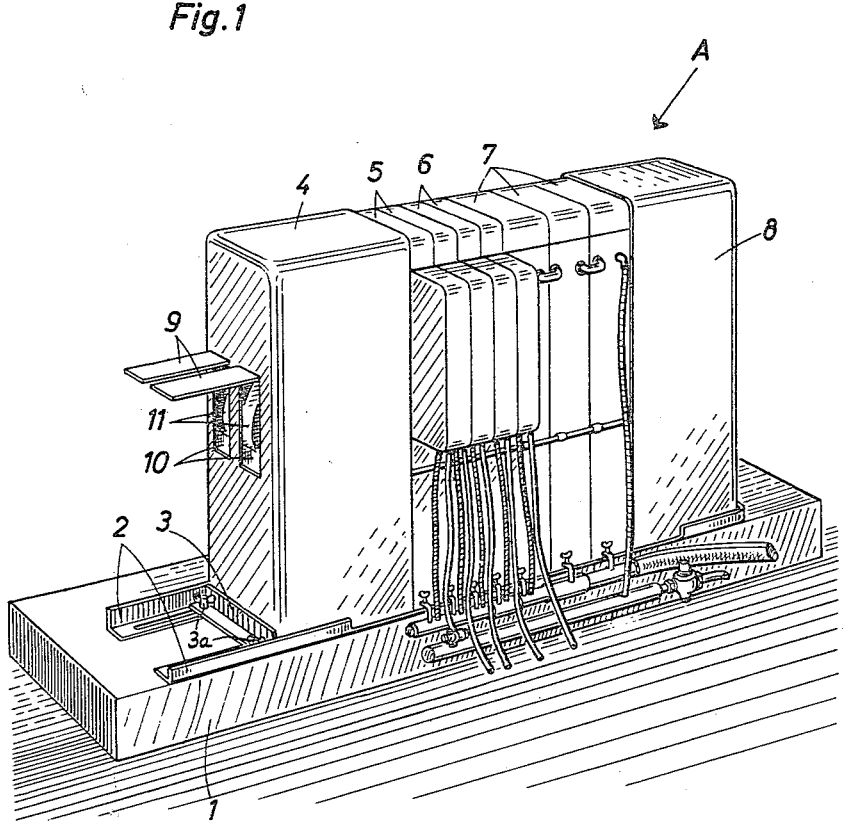
FIG. 1 is a perspective view of a film processing apparatus which utilizes a film conveying arrangement including sprocket chains constructed in accordance with our invention.

Referring now in greater detail to the drawings, and first to FIG. 1, there is shown a film processing apparatus A which comprises a base 1 mounting a pair of guide rails 2, these rails slidably supporting an assembly including a front part 4, two film developing tanks 5, two fixing tanks 6, three washing tanks 7, and a rear part 8, the parts 4, 8 and the tanks 5, 6, 7 being slidable longitudinally of the rails 2 and adapted to be arrested in a selected position by a transverse member 3 which may be releasably secured to the rails 2 by wing nuts 3a. The front wall of the part 4 is formed with two rectangular inlet apertures 10 which may be alternately or simultaneously sealed against the entry of light by two hinged flaps 9. The apertures 10 serve as a means for permitting the introduction of two exposed films 11 each consisting of a carrier and an emulsion applied to one side of the carrier. The carrier may consist of paper or of a plastic material such as is customarily used in roll films for photographic cameras. Once introduced into the front part 4, the films 11 are thereupon caused to advance in a meandering path through the tanks 5, 6, 7 and may be withdrawn through suitable apertures, not shown, provided in the rear part 8. The exact construction of the film processing apparatus A shown in FIG. 1, save for the construction of the film conveying arrangement utilized therein, forms no part of our invention.

Figure 2:
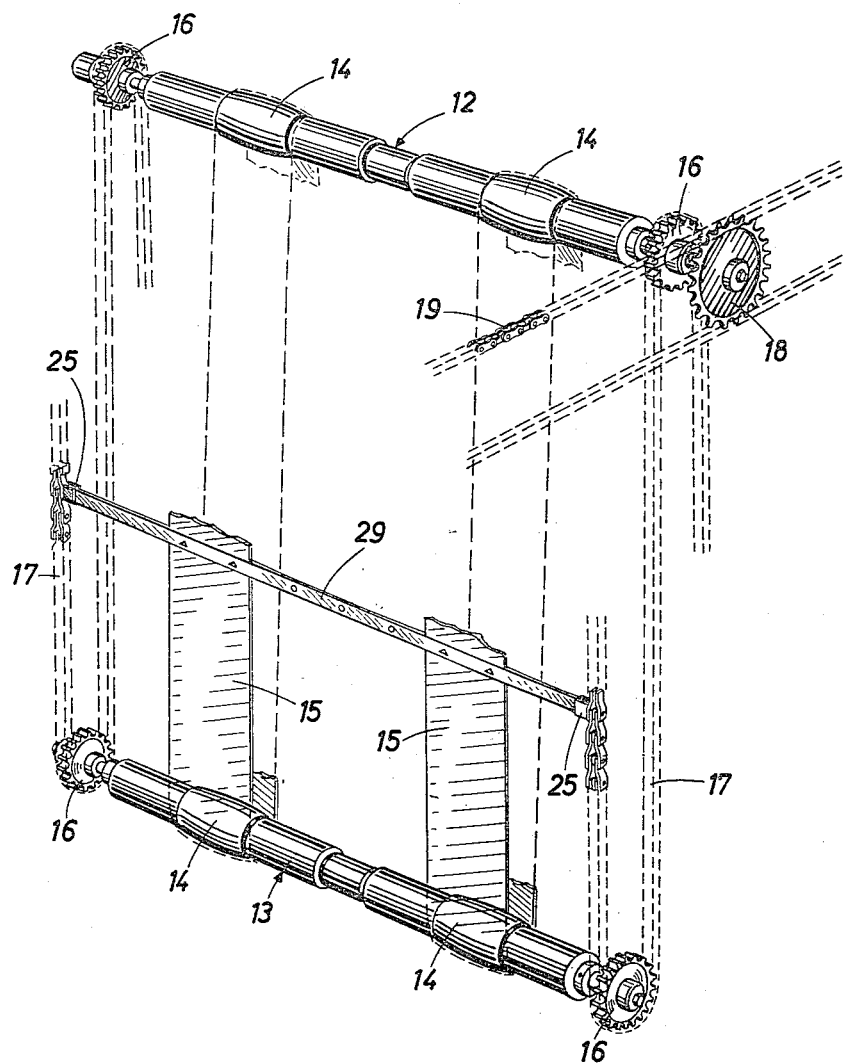
FIG. 2 is a greatly enlarged fragmentary perspective view of the film conveying arrangement forming part of the apparatus shown in FIG. 1.

The film conveying arrangement is shown in greater detail in FIG. 2. It comprises a plurality of spaced parallel upper and lower deflecting rollers 12, 13, respectively, which guide and deflect the strips 15 forming part of the film rolls 11. At least one lower deflecting roller 13 is provided in the bottom zone of each tank 5, 6, 7; the upper deflecting rollers 12 are mounted above and between the adjacent tanks so that the strips 15 of film rolls 11 travel in a meandering path on their way from the front part 4 to the rear part 8 of the apparatus A. As is well known in the art, the apparatus preferably comprises means which permits adjustments in the position of deflecting rollers 12 and/or 13. Each roller comprises two spaced substantially barrel shaped film guiding portions 14 about which the strips 15 are led when at least one of the rollers 12, 13 is driven by an electric motor or the like, not shown in FIGS. 1 and 2. For example, FIG. 2 shows a driving arrangement for the upper deflecting roller 12 comprising a sprocket 18 and an endless metallic roller chain 19 of any known design. Both runs of this chain are substantially horizontal so that the chain 19 may be simultaneously drive all upper deflecting rollers 12 installed in the apparatus A of FIG. 1.

Each upper and lower deflecting roller also mounts two additional sprockets 16 for guiding and driving two spaced endless sprocket chains 17 of the type somewhat resembling so-called pintle chains, these chains being constructed in accordance with our invention in a manner which will be described in greater detail in connection with FIGS. 3 and 4. The effective diameters of sprockets 16 preferably equal the maximum diameters of barrel shaped film guiding portions 14.

Figure 3:
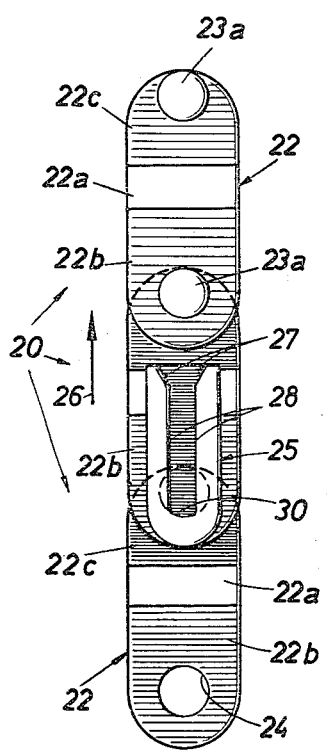
FIG. 3 is an end view of three releasably connected plastic links forming part of our improved sprocket chain.
Figure 4:
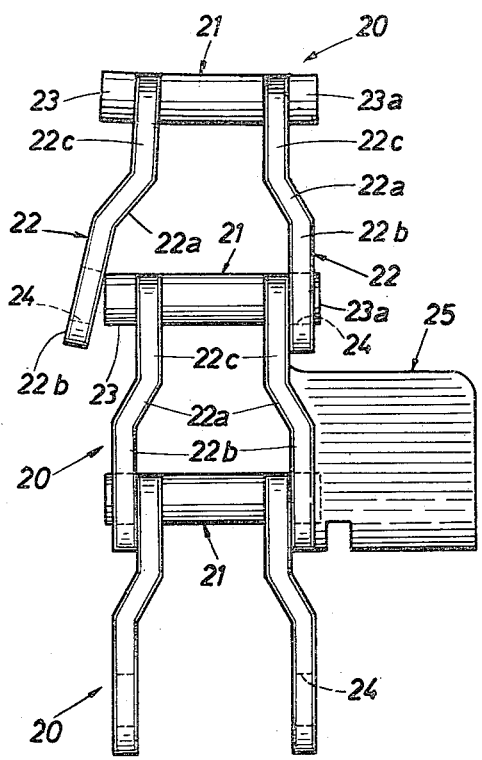
FIG. 4 is a front elevational view of the links shown in FIG. 3.

Referring now to FIGS. 3 and 4, there are shown three substantially U-shaped links 20 of our novel sprocket or pintle chain, each of these links being formed as an integral one-piece structure and each consisting of at least slightly elastic synthetic plastic material. Each link 20 comprises a pintle 21 having two terminal portions 23, 23a of circular cross-sectional contour, and a central portion or connecting member which extends between two side plates 22. The terminal portions 23, 23a actually constitute outwardly extending projections of the side plates 22. As is best shown in FIG. 4, each side plate 22 comprises a first end portion 22c, an offset median portion 22a, and a second end portion 22b. The end portions 22c of two side plates 22 forming part of the same link 20 are integrally formed with the pintle 21 and are connected to the pintle intermediate and preferably immediately adjacent to the terminal portions 23, 23a. The second end portions 22b are formed with circular openings 24 which may snugly receive the terminal portions 23, 23a of the pintle 21 forming part of the adjacent link 20. The terminal portions 23, 23a are rotatably received in their respective openings 24 so that the end portions 22b may rotate about the same. Each opening 24 and the terminal portion or projection 23 or 23a received therein constitute a pair of complementary coupling means for releasably connecting a side plate of a first link with a side plate of a second link. As is shown in the lower part of FIG. 4, the first end portions 22c and the second end portions 22b of two properly assembled links 20 or of two loose links are parallel with each other, and the distance between the second end portions 22b exceeds the distance between the first end portions 22c, i.e. the offset median portions 22a diverge outwardly in a direction from the first toward the respective second end portions. Since the material of links 20 is at least slightly elastic, a chain assembled of such links is extendable in the longitudinal direction thereof and will automatically return to its original length as soon as the stresses causing its expansion are terminated. In addition, since the elasticity of the plastic material of which the links 20 consist permits the second end portions 22b to be bent laterally with respect to the first end portions 22c, or the entire side plates 22 to be bent laterally and away from each other (see the left-hand plate 22 of the uppermost link 20 shown in FIG. 4), the second end portions 22b may be readily separated from the respective terminal portions 23 or 23a so that a defective link 20 may be replaced by a new one or that an operator may shorten or lengthen the chain consisting of such links with very little loss in time. However, the material of links 20 is preferably such that the side plates 22 retain their positions when in engagement with the pintles 21 so that no separation of links can take place in actual use excepting under substantial deforming pressures or when the links are intentionally separated by an operator. In other words, when in unstressed condition, the distance between the second end portions 22b preferably equals the distance between the terminal portions 23, 23a the inner sides of second end portions 22b preferably abutting or being close to the outer sides of first end portions 22c forming part of an adjacent link 20.

It has been found that polyamide is a very satisfactory material for the production of our improved chain. Its elasticity is good and, therefore, a polyamide chain will not tear in actual use because any foreign bodies entering between the chain and its sprockets (i.e. between the chains 17 and sprockets 16 of the film conveying arrangement shown in FIG. 2) will merely cause the chain to expand whereupon the chain immediately and automatically returns to its original length as soon as the foreign body is removed. The offset portions 22a further improve the elasticity of links 20 and thus contribute to greater elastic deformability of the chain in the longitudinal direction thereof. A further very important advantage of polyamide is that it is self-lubricating, i.e. the surfaces of polyamide links will be lubricated by the liquid in tanks 5, 6 and 7 to permit free rotation of terminal portions 23, 23a in the openings 24 of the respective end portions 22b.

Certain side plates of each chain 17 are integrally formed with entraining means 25 which preferably comprise substantially U-shaped body portions or pockets and are provided at the outer sides of selected side plates 22, i.e. at such sides of side plates which are turned away from the aligned side plates forming part of the same links 20. As is best shown in FIG. 3, the U-shaped body portion of an entraining member 25 defines a recess 30 which opens in the direction in which the chain advances (arrow 26), the dimensions of the recess 30 being such that the ends of a film supporting bar 29 shown in FIG. 2 will be received with friction in the aligned recesses 30 of two spaced entraining members 25. According to a preferred embodiment of our invention, the recess 30 is bounded by a first pair of faces 28 which converge at least slightly toward the open end of the recess, and by a pair of outwardly diverging shorter faces 27 which are located at the open end of the recess and permit convenient insertion of the film supporting bar 29. As shown in FIG. 2, the bar 29 usually consists of flat metallic or plastic stock and removably supports the strips 15, the connections between the bar 29 and strips 15 consisting of paper clips or any other suitable readily separable devices. The bar 29 may be separated from the chains 17 merely by drawing its end portions through the open ends of recesses 30 or by moving the chains 17 away from each other so that the entraining members 25 are slid off the end portions of the bar 29 in the latter's longitudinal direction.

Of course, it will be readily understood that the use of chains 17 constructed in the manner as illustrated in FIGS. 3 and 4 and of the supporting bar or bars 29 is not restricted to the transport of strip-like paper or plastic films but that the bar of bars 29 may support individual films. In such instances, the transporting or conveying arrangement comprises a larger number of supporting bars 29 which are spaced from each other at intervals whose length slightly exceeds the length of individual articles connected thereto.

Furthermore, the film conveying arrangement of FIG. 2 renders it possible to utilize the apparatus A in daylight even if the strips 15 are not connected to the same supporting bar 29 and even if both strips 15 need not be introduced or withdrawn at the same time. Since the chains 17 are connected solely by one or more preferably flat film supporting bars 29, the interior of machine parts 4 and 8 may be readily partitioned in a manner to prevent entry of light into one half when the other half is open and vice versa. This is a considerable advantage over the prior constructions which utilize endless belts or steel chains because such prior constructions cannot be properly sealed at the intake end to permit access to one emulsion carrier while avoiding exposure of the other emulsion carrier or carriers to daylight.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A chain, particularly for use in film processing apparatus, said chain comprising, in combination, a plurality of substantially U-shaped adjacent links each consisting of at least slightly elastic plastic material and each comprising a pintle and two elongated side plates, each side plate having a first end portion integral with said pintle and a second end portion rotatably mounted on the pintle of the adjacent link; and entraining means integrally connected with a side plate of at least one of said links.

2. A chain, particularly for use in film processing apparatus, said chain comprising, in combination, a plurality of substantially U-shaped adjacent links each consisting of at least slightly elastic plastic material and each comprising a pintle and two elongated side plates, each side plate having a first end portion integral with said pintle and a second end portion rotatably mounted on the pintle of the adjacent link; and entraining means integral with one side plate of at least one of said links, said entraining means projecting in a direction away from the other side plate forming part of said one link and formed with an open recess extending longitudinally of said one side plate.

3. A chain, particularly for use in film processing apparatus, said chain comprising, in combination, a plurality of substantially U-shaped adjacent links each consisting of at least slightly elastic plastic material and each comprising a pintle and two elongated side plates, each side plate having a first end portion integral with said pintle and a second end portion rotatably mounted on the pintle of the adjacent link; and entraining means integral with one side plate of at least one of said links, said entraining means consisting of a substantially U-shaped body portion projecting in a direction away from the other side plate forming part of said one link and formed with an elongated recess extending longitudinally of said one side plate, said recess having an open end and said entraining means having two faces bounding said recess and converging at least slightly in a direction toward said open end.

4. A chain, particularly for use in film processing apparatus, said chain comprising, in combination, a plurality of substantially U-shaped adjacent links each consisting of at least slightly elastic plastic material and each comprising a pintle and two elongated side plates, each side plate having a first end portion integral with said pintle and a second end portion rotatably mounted on the pintle of the adjacent link; and entraining means integral with a side plate of at least one of said links, said entraining means comprising a substantially U-shaped body portion projecting in a direction away from the other side plate forming part of said one link and formed with an elongated recess extending longitudinally of said one side plate, said recess having an open end and said entraining means having a first pair of faces bounding said recess and converging at least slightly in a direction toward said open end and a second pair of diverging faces at said open end.

5. A chain, particularly for use in film processing apparatus, comprising a plurality of substantially U-shaped links each having a connecting member, two side plates consisting of at least slightly elastic plastic material and each having a first end portion integral with said connecting member and a second end portion, and coupling means provided at the second end portion of each side plate for releasably connecting the second end portion of a side plate forming part of a first link with the pintle forming part of a second link.

6. A chain as set forth in claim 5, wherein said links consist of self-lubricating synthetic plastic material.

7. A chain, particularly for use in film processing apparatus, comprising a plurality of substantially U-shaped links each having a connecting member, two side plates consisting of at least slightly elastic plastic material, each side plate having a first end portion integral with the respective connecting member, a second end portion, and an offset median portion permitting longitudinal expansion of the side plate, and coupling means provided at the second end portion of each side plate for releasably connecting the second end portion of a side plate forming part of a first link with the pintle forming part of a second link.

8. A chain as set forth in claim 7, wherein the distance between the second end portions of the side plates forming part of a link exceeds the distance between the first end portions of the side plates.

9. A chain as set forth in claim 7, wherein each of said coupling means comprises opening means formed in the second end portion of each side plate, each opening means adapted to turnably receive a portion of an adjacent pintle.

10. A chain as set forth in claim 9, wherein such portions of said pintles which are received in the respective opening means constitute coaxial projections of the respective pintles and extend outwardly and beyond the first end portions of the respective side plates.

References Cited in the file of this patent
UNITED STATES PATENTS

| | | |
|---|---|---|
| 1,658,094 | Paschen et al. | Feb. 7, 1928 |
| 2,600,574 | Rayburn | June 17, 1952 |
| 2,938,329 | Onulak | May 31, 1960 |

FOREIGN PATENTS

| | | |
|---|---|---|
| 749,828 | Great Britain | June 6, 1956 |